(12) United States Patent
Schmitt et al.

(10) Patent No.: US 9,473,732 B2
(45) Date of Patent: Oct. 18, 2016

(54) SELF CORRECTING RECORD PIPELINE

(71) Applicant: General Instrument Corporation, Horsham, PA (US)

(72) Inventors: Ernest G. Schmitt, Maple Glen, PA (US); Faisal Anwar, Bangalore (IN); Surya P. Maheswaram, Miyapur (IN); Manu Shrot, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 103 days.

(21) Appl. No.: 14/247,369

(22) Filed: Apr. 8, 2014

(65) Prior Publication Data

US 2014/0334800 A1    Nov. 13, 2014

(30) Foreign Application Priority Data

May 31, 2013   (IN) .............................. 654/KOL/2013

(51) Int. Cl.
*H04N 5/76*   (2006.01)
*H04N 5/91*   (2006.01)
*H04N 9/804*  (2006.01)
*H04N 9/82*   (2006.01)

(52) U.S. Cl.
CPC ................ *H04N 5/76* (2013.01); *H04N 5/91* (2013.01); *H04N 9/8042* (2013.01); *H04N 9/8205* (2013.01)

(58) Field of Classification Search
None
See application file for complete search history.

(56) References Cited

U.S. PATENT DOCUMENTS

| | | | |
|---|---|---|---|
| 6,233,389 B1 | 5/2001 | Barton et al. | |
| 2002/0048450 A1* | 4/2002 | Zetts | G11B 27/002 386/329 |
| 2006/0080520 A1* | 4/2006 | Dickenson | G06F 11/0715 711/170 |
| 2009/0234841 A1* | 9/2009 | Watanabe | G06F 17/30952 |
| 2010/0010967 A1* | 1/2010 | Muller | G06F 17/30587 707/E17.014 |
| 2014/0093223 A1* | 4/2014 | Knee | G09G 5/003 386/326 |

* cited by examiner

*Primary Examiner* — Eileen Adams
(74) *Attorney, Agent, or Firm* — Lori Anne D. Swanson (57) ABSTRACT

Systems and methods for a self-correcting DVR record pipeline may provider for simpler, lower cost transport producer hardware elements. A free running transport pipeline producer may fill transport buffers without waiting for feedback from the data consumer that data has been completely processed. The pipeline data consumer independently detects transport buffers that are overwritten before processing on the buffer content is complete. The pipeline data consumer drops or deletes any invalid content or stream data to recover from the data overflow condition.

24 Claims, 8 Drawing Sheets

SELF CORRECTING RECORD PIPELINE

CLAIM FOR PRIORITY

The present disclosure claims foreign priority to Indian Patent Application No. 654/KOL/2013, entitled "Self Correcting DVR Record Pipeline", and filed May 31, 2013, the contents of which is incorporated herein by reference in its entirety.

FIELD

The present disclosure relates generally to digital video recorders (DVRs) and more particularly to a self-correcting record pipeline.

BACKGROUND

Recording video and/or television content in digital formats on hard disk drives for subsequent use has become increasingly common. Digital video recorder (DVR) systems are example recorders that record content in digital formats on a hard disk drive using, for example, Moving Picture Experts Group (MPEG)-2 compression. In a DVR system, the producer, i.e., the hardware generating the content to be stored, manages the flow of transport data to the consumer that handles recording. If there is an overflow condition reported back to the producer, the producer can slow down the flow of transport data, stop generating content, and/or drop excess data. Furthermore, a DVR system generates index records containing position references for the picture start codes in the recorded transport stream. The producer will drop excess transport data to maintain accurate start code position references.

However, in order to maintain continuous functionality, the producer in existing DVR systems require feedback from the consumer to identify when an overflow condition has occurred, so that the producer can respond by managing the output of data and dropping excess data. During the recording process sometimes the client device, or more specifically the storage device, becomes sluggish in response to the receipt of data resulting in a data overflow condition.

The existing solutions for DVR recording have less than optimal results, such as a continued sluggish system while waiting for feedback, data loss during recording, a hung system (e.g., if there is a storage device (Hard Disk—HDD) failure) or the like. Improved techniques for handling a sluggish client device or faulty storage device are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed herein are techniques for a self correcting DVR pipeline for use in DVR recording systems. As described in more detail below, the disclosed DVR pipeline(s) may provider for simpler, lower cost transport producer hardware elements.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A personal video recorder (PVR) or digital video recorder (DVR) is a client device or software hosted on a client device that records video in a digital format to storage, referred to herein as a DVR client device. A DVR client device, for example, may be a set top box (STB) DVR that supports recording of content/programs, having DVR capabilities. Other example DVR client devices, e.g., client devices having DVR capabilities, include portable media players with recording, recorders such as camcorders that record onto memory cards, and personal computers with software that captures video and stores the video on a hard disk drive for playback.

A DVR client device receives content (e.g., a television signal) via at least one tuner through antenna, cable, or satellite. For example, in a satellite network, a DVR client device, e.g., a STB, may receive video signals from television network distribution nodes that are maintained by service providers (e.g., DirecTV, Dish Network) and distributed from the service provider's satellites. In a cable network, the DVR client device may receive video signals from regional headends from a service provider (e.g., a multiple system operator (MSO), such as Comcast, Time Warner, Cox Communication, etc) in a cable television network. The signal may pass through a hierarchy of nodes, such as a headend, fiber optic line, a series of amplifiers, etc, before reaching the DVR client device.

The DVR feature on a DVR client device, such as a set-top box, often supports a number of channels that provide content streaming between a content source and content destination. The content source generally refers to the provider of the content to the channel or channels that feed content to the DVR pipelines. The content source may be hardware that provides content to the DVR pipelines via hardware that delivers content to the DVR pipelines via an interface, such as a device driver, for recording, playback, and/or indexing. The content source may be the transport processor decoder that decodes content received from a service provider network. The content source may be the channel hardware over which content is provided to the DVR record pipelines for recording. The content source may be a processor integrated in the DVR client device or it may be part of a separate device, such as part of a server providing content to a thin client DVR client device.

Examples of devices that may employ the disclosed techniques are thin client DVRs, where most processing occurs at a server. Thus, the thin client DVR may maintain (simple processing) Digital video recorders (DVRs) may rely on a server to operate. Such DVRs may be referred to as thin client DVRs, where applications are deployed, managed, supported, and executed on the server and not on the DVR. Thin clients generally rely on a server to operate. Thus, the thin client provides basic processing power to interact with the server, but relies on the principles of server-based computing. Applications can be deployed, managed, supported, and executed on the server and not on the client. Thin clients are often simpler to manage because the thin client operating system is deployed centrally and includes a remote terminal client. A single point of administration reduces overall administration costs.

A virtual connection is a logical connection made between a specified content source and a content destination, effectively bridging these two points with the DVR pipeline. A DVR client device is generally designed to support a specified number of channels, which can be opened for a specific virtual connection.

Figure 1:
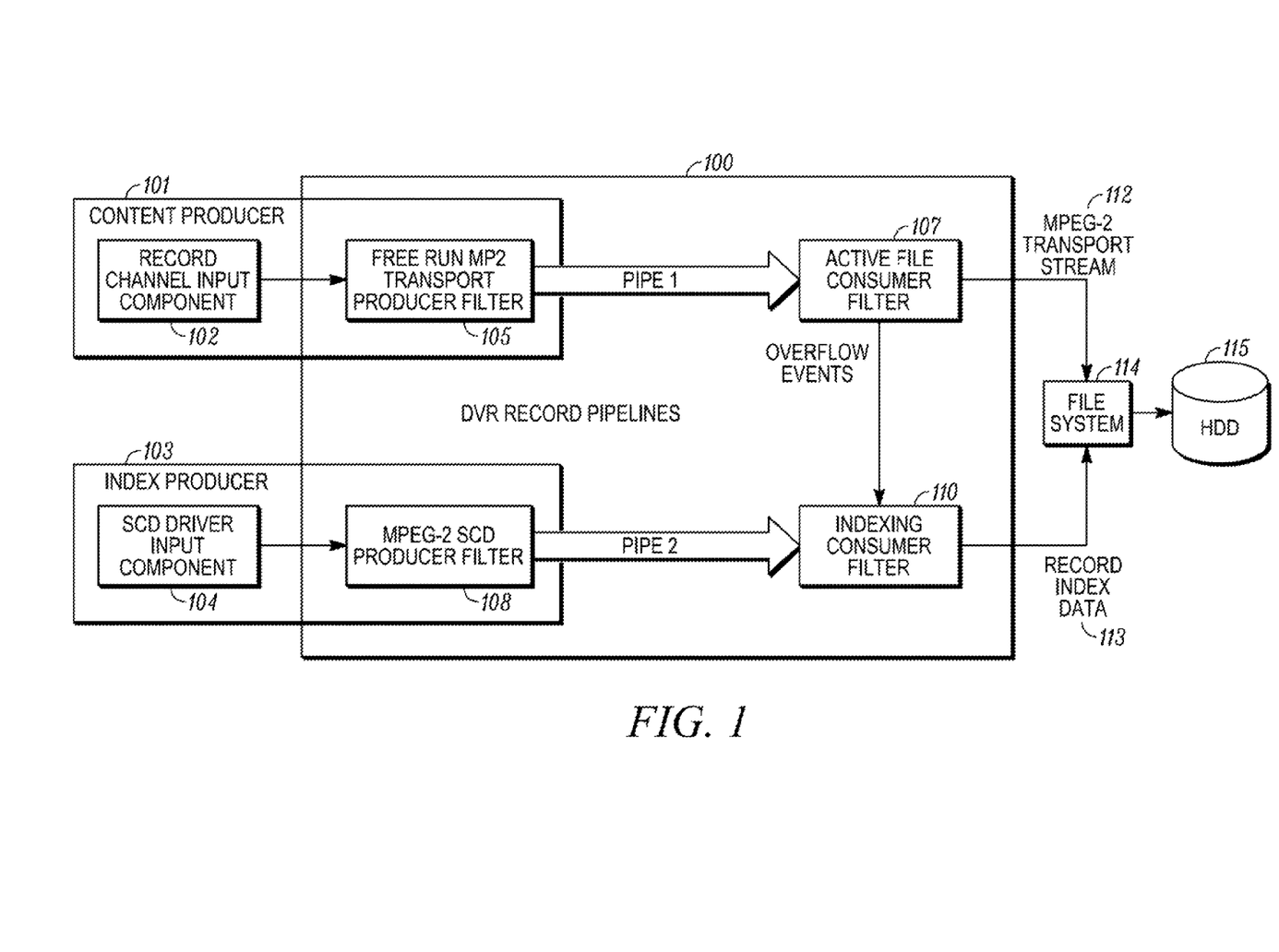
FIG. 1 depicts an example DVR record pipeline for recording digital content streams.

FIG. 1 depicts example DVR record pipelines 100 that interact with hardware device drivers 102, 104 and a disk file system 114. In this example, the content source streams content through a record channel, that interfaces with the DVR pipeline 100 via record channel input component 102, and a start code detect (SCD) channel, that interfaces with the DVR pipeline 100 via SCD input component 104. The content destination is the hard disk drive 115, to which the DVR record pipeline 100 writes content.

DVR pipelines are used to stream content across the virtual connection between the content source and content destination, independent of the content type. The software component that manages this connection is referred to as a Session. The connection itself is referred to as a virtual connection (VC) because the source and destination are effectively connected or bridged as long as the Session is active.

A DVR pipeline 100 includes an arrangement of processing elements, made up of hardware elements, software elements, or a combination of both. A pipeline design pattern for moving transport stream data for recording to storage device 115 may include a set of pipes 1, 2 and filters 107, 110, and may be selected to implement a required or desired sequence of processing steps. Generally, a pipeline 100 uses a generic design pattern to stream content across a virtual connection independent of the content type. At least one chain of processing elements in the pipeline is arranged such that the output of each element is the input of the next, usually with some amount of buffering provided between consecutive elements. The design pattern is often a tested, proven solution to a common problem within a software design.

The DVR record pipelines 100 depicted in FIG. 1 includes filters 105, 107, 108, and 110 that use messages to pass information across pipes 1, 2. Filters 105, 107, 108, and 110 represent a process or component that reads messages from an input pipe, processes each message, and then writes the result to an output pipe. Pipes, such as pipe 1 and pipe 2 in FIG. 1, provide a mechanism for the transfer of data between adjacent filters in the pipeline. Pipes provide for synchronization of data transfers between filter objects and for activation of filters as set out in the desired pipeline design pattern. Thus, the pipeline is an arrangement of filters connected by pipes.

The operations performed by filters in a DVR pipeline 100 include preparation of stream index data to support DVR trick plays and data buffering to compensate for the relatively slow response time of the disk drive 115. The record channel pipeline is made up of the free run MP-2 transport producer filter 105, pipe 1, and an active filter, active file consumer filter 107. The indexing channel pipeline is made up of the MPEG-2 SCD producer filter 108, pipe 2, and the indexing consumer filter 110. Producer filters 105 and 108 generate messages for output on a pipe. Consumer filters 107 and 110 are filters that consume messages, taking messages in from a pipe. Active filters may be instantiated with their own threads and loops to perform their operations.

The producer and consumer are described in more detail throughout this description. Generally, a producer refers to the composite hardware and/or software (e.g., source object) within the DVR client device that receives a transport stream from the demodulator that is intended for recording. As used herein, a producer is used interchangeably with the term producer filter and a consumer is used interchangeably with the term consumer filter. As shown in FIG. 1, for example, content producer 101 refers to the record channel hardware 102 and the transport producer filter 105, and the index producer 103 refers to the SCD hardware 104 and the SCD producer filter 108. The producer generates buffer descriptors to be sent to the consumer. The content producer 101 is the source of content delivered to a consumer 107.

Generally, the consumer refers to the software (e.g., synch object) and/or storage hardware that creates the DVR content and index files. The corresponding pipeline filters 107, 110 are the software parts of the producer and consumer. As described in more detail below, along the pipe between the producer and consumer, messages may be buffered and an overflow of data may occur if the consumer is not able to consume (i.e., write data to storage) quickly enough.

A DVR client device receives content from a content network and content for recording and playback is distributed to DVR pipelines. If necessary, the DVR client device will encode the received content (e.g., encoding an analog signal to digital) before delivering the content to the DVR record pipelines 100. If the content is already digitally encoded, the DVR record pipelines 100 can process the digital streams and store the content directly to the storage device 115 without encoding.

The filter objects in the DVR pipelines interact with record channel hardware 102 via the interfaces defined for the record channel and Start Code Detect (SCD) channel to receive content for recording. As shown in FIG. 1, the filters 105 and 108 in the DVR Pipeline 100 interact with the record channel input component 102 and SCD input component 104, respectively to move content through the pipeline from a Record Channel and a SCD channel to the hard disk drive 115.

The record channel pipeline, made up of the free run MP-2 transport producer filter 105, pipe 1, and active file consumer filter 107, effectuates the streaming and recording of content. In the embodiment shown in FIG. 1, the free run MP2 transport producer filter 105 reads blocks of input data from the record channel input component 102 and passes the data blocks over Pipe 1 to the next filter in the pipeline using the pipeline pattern. Subsequent filters may be included in the pipeline process (not shown) that process the data blocks using a required or desired pipeline pattern. The content data blocks are held in memory buffers managed by the pipeline filers until the data blocks are ready to be transferred to the pipeline consumer filter, shown as active file consumer filter 107. The consumer filter 107 writes the data blocks to the File System 114 for storage on the hard disk drive 115.

The indexing channel pipeline includes the MPEG-2 SCD producer filter 108, pipe 2, and the indexing consumer filter 110. The corresponding index data stream 113 (e.g., Record Index data) is received via SCD input component 104 and is moved by the indexing channel pipeline from the SCD device driver 104 to the hard disk drive 115. For index data blocks from SCD input component 104, the stream index data is processed by an indexer. The MPEG-2 SCD Producer filter 108 reads blocks of index data from the SCD channel driver 104 and passes the data blocks over Pipe 2 to the next filter in the pipeline using the pipeline pattern. Subsequent filters may be included in the pipeline process (not shown) that process the data blocks using a required or desired pipeline pattern. The index data blocks are held in memory buffers managed by the pipeline filers until the data blocks are ready to be transferred to the pipeline consumer filter, shown as indexing consumer filter 110. The indexing consumer filter 110 writes the data blocks to the File System 114 for storage on the hard disk drive 115.

The DVR record pipelines 100 are configured to record content received in a digital format to a storage device 115, such as a disk drive 115, USB flash drive, SD memory card, or other local or networked mass storage device 115. The filters may use a system API to access data on the disk storage device 115. As shown in FIG. 1, DVR Record Pipelines 100 uses file system 114 to store and retrieve content data on the IDE disk device 115.

DVR pipelines provide interfaces for controlling playback and record of stream and index data and may perform overall control of the DVR trick plays. For example, DVR pipelines may perform operations to locate and retrieve content or stream index data needed by the DVR pipeline 100 client to implement DVR trick plays. DVR record pipelines 100 include a content record pipeline and an indexing channel pipeline.

It is desirable that the DVR Pipeline 100 accommodate a relatively long latency of hard disk 115 operations or a failed hard disk drive 115 without interruptions or loss of stream data. In existing DVR record pipelines 100, the producer of transport stream data for recording must wait for the storage device 115 or consumer 107 of the stream to report to the producer that processing is complete before new stream data can be accepted, otherwise buffers between the producer and consumer 107 may be filled and cannot write to the hard drive 115 at all or quick enough to release buffers for recording new data. Requiring a producer (e.g. the provider of content to the consumer 107 for recording) to be informed via a feedback loop from the consumer 107 regarding overflow conditions is not cost-efficient and requires processing on the part of the producer or hardware content provider.

Disclosed herein is a DVR record pipeline 100 where a free running stream producer creates stream data buffers without waiting for feedback from the data consumer 107 that data has been completely processed. The pipeline data consumer 107 independently detects any data buffers that are overwritten before complete processing then drops or deletes any invalid stream data in the resulting stream file. The consumers 107, 110 may also corrects any discrepancies in the DVR index data resulting from dropped stream data.

As disclosed, the memory buffers for the playback and record channel pipelines are accessible to the transport pipeline producer. The transport pipeline producer will fill transport data buffers without notification that a transport buffer has been processed by the file consumer 107. Rather than allowing the hardware to write new transport data in to a buffer only if the buffer has been designated in a feedback loop from the consumer 107 as free or available, previously filled transport buffers will be overwritten as needed with new transport data such that selected program data packet identifiers (PIDs) will be stored in transport buffers without stopping the transport data flow due to lack of free buffer space.

If no new buffer is available, existing systems require that the hardware drop and create an interrupt indicating an overflow, meaning there is more data to be delivered but not enough buffer space. As disclosed, the consumer, e.g., file consumer filter 107, can detect the transport data overflow condition by verifying that a checksum for the data buffer matches the checksum computed when the buffer was filled in the transport producer. The checksum verification may be done after buffer data has written to the hard disk 115 to verify the buffer was not overwritten by new transport data before the buffer data was successfully written to the hard disk 115.

If the checksum verification fails then action is taken to recover and catch up to the current producer position. An overwritten transport buffer may need to be dropped either before or after being written to the content stream file. The checksum may be verified after writing to the file to ensure the buffer was not overwritten during the file write. Once an overflow has occurred, then the checksum on the subsequent buffers is verified before a time consuming file write is done. The pre-write check may be done on every buffer until a buffer with a valid checksum is successfully written to the content file. If the first content in the transport buffer is overwritten by subsequent data before being successfully written to a content stream file, the pipeline data consumer 107 may drop the overwritten buffers to recover from the data overflow. A variation on this is to perform the pre-write checksum verification on every transport buffer regardless of whether an overflow condition has already been detected. The alternative version simplifies the coded logic but may increase the CPU load since all buffers would then be checked twice.

If transport data in producer buffers is overwritten by new data before being successfully written to the content stream file, the overwritten buffers may be dropped to recover from the producer overflow condition. The hardware does not require feedback from the consumer that there is an overflow and, as a result is not required to provide an interrupt or indicator that there is more data to be delivered but not enough buffer space.

In embodiments, the pipeline data consumer 107 can choose to write the transport data that has failed checksum verification to the content data file. The limits of such transport data which has failed checksum can be written onto another separate meta file. This separate file created can then be used at the time of playback to maintain the continuity of the playback. This would avoid the overhead of dropping content data on the consumer 107 side. Also, the pipeline data consumer 107 can choose to continue writing the index data onto the hard drive 115. This would avoid the overhead of dropping/correcting index data on the consumer 107 side. This method would save considerable amount of computation power. A system low on CPU processing capacity can benefit from this method.

As disclosed herein, the record pipeline producer is free running and independent of the pipeline data consumer 202. For example, the DVR record pipelines 100 may write to available memory in an unrestrained fashion, treating available buffers in the circular memory of buffers in a continuous record. The transport pipeline producer then is resultantly writing to the buffers in a free running, unrestrained fashion. A buffer is available if it is the next buffer in the sequence to be filled, regardless if data in that buffer has been completely written to storage. Thus, as a buffer is filled it creates a notification to code that then writes the data to the hard drive 115, thereby providing notification to the process within the DVR record pipelines 100 that writes to the hard drive 115, but not requiring the producing side to wait for the data to be written. A feedback loop returning feedback to the producer regarding buffer availability or overflow from the consumer 202 is not necessary. Instead, data is written contiguously in to the buffers.

In other words, the consumer 202, e.g., consumer filters 107 and 110, is notified that data is available, but the producer does not require feedback from the consumer 202 to continue to send data. Rather, the pipeline data consumer 202 detects and corrects for discrepancies in the content stream and index data records resulting from data not successfully written to the content stream file, without providing feedback to the producer.

The disclosed DVR pipeline 100(s) and manner for handling overflow buffer conditions may provide for simpler, lower cost transport producer hardware elements. If the hard drive 115 is over-run, a feedback loop that indicates whether a buffer is available or has been released is not required for the hardware producer to continue to send data. Rather, if writing to the hard drive 115 is not occurring quickly enough, a buffer is overwritten, dropped or ignored. This eliminates the requirement that a checksum be verified and fed back to the producer in order to receive/record additional data. The producer is blind to whether data that is provided is discarded or ignored by the consumer 202, thereby limiting the interruption to the producer's provision of data. Rather than requiring a feedback mechanism to inform the producer of an overflow, to control new data streams and how they are buffered, the disclosed techniques provider for a self-correcting record pipeline that does not rely on the feedback loop to the producer in order to handle sluggish or faulty systems. The producer in this manner is unaffected by the handling of overflow data on the consumer 107 side. In embodiments, there is no communication or feedback between the backend (consumer 107/hard drive 115) and the producer related to buffer overflow. Thus, the producer does not drop data based on a feedback loop from the consumer 202 or backend hard drive 115.

Further, by moving responsibility for overflow processes to the consumer 202, less processing is required by the producer to keep data synched for trick plays. Index data received via interface SCD input component 104 may include frame info for trick plays. If the producer is responsible for managing the overflow processes based on feedback data from the consumer 202, the producer must record index data and record position data in the index data, so it is important that a frame identified as occurring at position x by the index data actually occurs at position x in the recorded stream. Thus, the producer that receives feedback regarding an overflow and drops stream data would also drop the corresponding index data to maintain the alignment between the index data and stream data. However, in the disclosed embodiments, the producer will be free flowing and will produce start code table (SCT) records irrespective of the data consumption by the file consumer 107. In disclosed embodiments, the producer no longer has to keep record data synched, and instead the producer writes data in to memory unrestrained. Rather the file consumer 107 puts a descriptor 1 in a queue and sends a message to active consumer filter 107. The message processing de-queues the descriptor 1 and further processes the descriptor 1.

The disclosed changes to the DVR record pipelines 100 include modifications to normal recording and to file consumer 107 overflow error recovery. During normal recoding, the transport pipeline producer will fill transport data buffers without notification from the buffer pool that a transport buffer has been processed by the file consumer 107. Previously filled transport buffers will be overwritten as needed with new transport data such that all selected program data will be stored in transport buffers without stopping the transport data flow due to lack of free buffer space. Further, to incorporate the disclosed techniques while preserving the ability to revert to previous techniques, the pipeline configuration may be modified to use a new producer and consumer filter 107. A transformer filter is not needed.

During instances of overflow, the hard disk storage device 115 may not respond quickly enough to write all transport buffers to the stream file before the pipeline producer overwrites a transport buffer with new data. This file consumer overflow may be caused by error conditions such as a marginal sector on the hard disk 115, mechanical vibration if the set top or external disk is bumped during use, or a hard disk 115 that is beginning to degrade due to age.

As disclosed herein, the DVR record pipeline 100 starts with a tuner or source of data (e.g., MPEG-2 transport data), receives the data in to a buffer or memory from hardware. The data from the buffer is then written in to a file on a hard disk 115 for recording the content (e.g., MPEG-2 content). To continuously stream and record content, multiple buffers may be used. When a buffer is allocated for data, the hardware fills up the buffer with transport data. When the buffer is filled the data is written to the hard drive 115. While this is happening, additional buffers may be available, such that a number of buffers may be allocated to receive transport data in succession so a buffer is readily available. Once the data from a buffer is written in to storage, the buffer will eventually be reused by the producer for recording. But, if data is available and data in a buffer has not yet been completely written to storage, the buffer is still available for buffering new content, overwriting content in the buffer.

It is noted that the sequence of pipeline filters 105 that process data may be configured for a device or based on data to be processed. For example, a DVR controller may determine the sequence of pipeline processing steps and instantiate the DVR pipeline 100 process. The sequence of pipeline processing steps may be determined by referencing a Pipeline library that maps data or clients to particular processing steps. The configuration of pipeline filters 105 may be established upon a creation of the pipeline for the designated purpose. For example, in a software module, pipeline filter instances that are applicable to record and playback of MPEG video services are defined in class diagrams, and the pipeline configuration may be a structure stored as a static configuration that may be instantiated. The structure is passed to a pipeline constructor. The pipeline configuration determines the sequence of operations the pipeline will perform. An initializing operation instantiates the active pipeline objects (e.g., filters, pipes) and specifies the data source and destination. As part of the initialization process, the system resources required for the pipeline operation may be acquired.

Although FIG. 1 depicts the stream data flowing through pipeline filters and pipes, it is noted that the stream data may be processed in-place by the pipeline filters 105. Data may move through the pipeline from input to the producer filter 105 and output to from the consumer filter 107. Transformer filters are not required for the self correcting record pipeline for managing pipeline buffer memory in the disclosed techniques because a first in-first out feedback loop is unnecessary processing for the self correcting record pipeline. The pipeline filter may determine whether the pipeline is data-driven (producer), demand-driven (consumer) or a combination. Further, the record pipeline producer and consumer may preserve the capability to stop and resume recording at the current stream position after a service change (tune) for a targeted advertising feature.

It is noted that a DVR that functions based on the disclosed techniques may be thin client DVR. Thus, a thin client DVR record pipeline 100 design based on the present disclosure removes notification of a transport buffer release in the pipeline file consumer 107 and modify the transport producer to continuously fill transport buffers regardless of the file consumer 107 ability to write all transport buffers to the content stream file on the storage device 115.

In embodiments, DVR pipeline 100 functionality is managed by a software module. The DVR pipeline 100 software may use a file system 114 module to store and retrieve content data on the IDE or SATA disk device 115. In embodiments, the DVR pipeline 100 software module operates in the DCII/DCT system protocol environment where the DCII MSP version 1.11 and the DCT MSP version 7.0 are supported. The DVR pipeline 100 in this embodiment supports the record and playback of digital services including MPEG-2 video, DCII video, and/or Dolby AC3 audio streams.

Figure 2A:
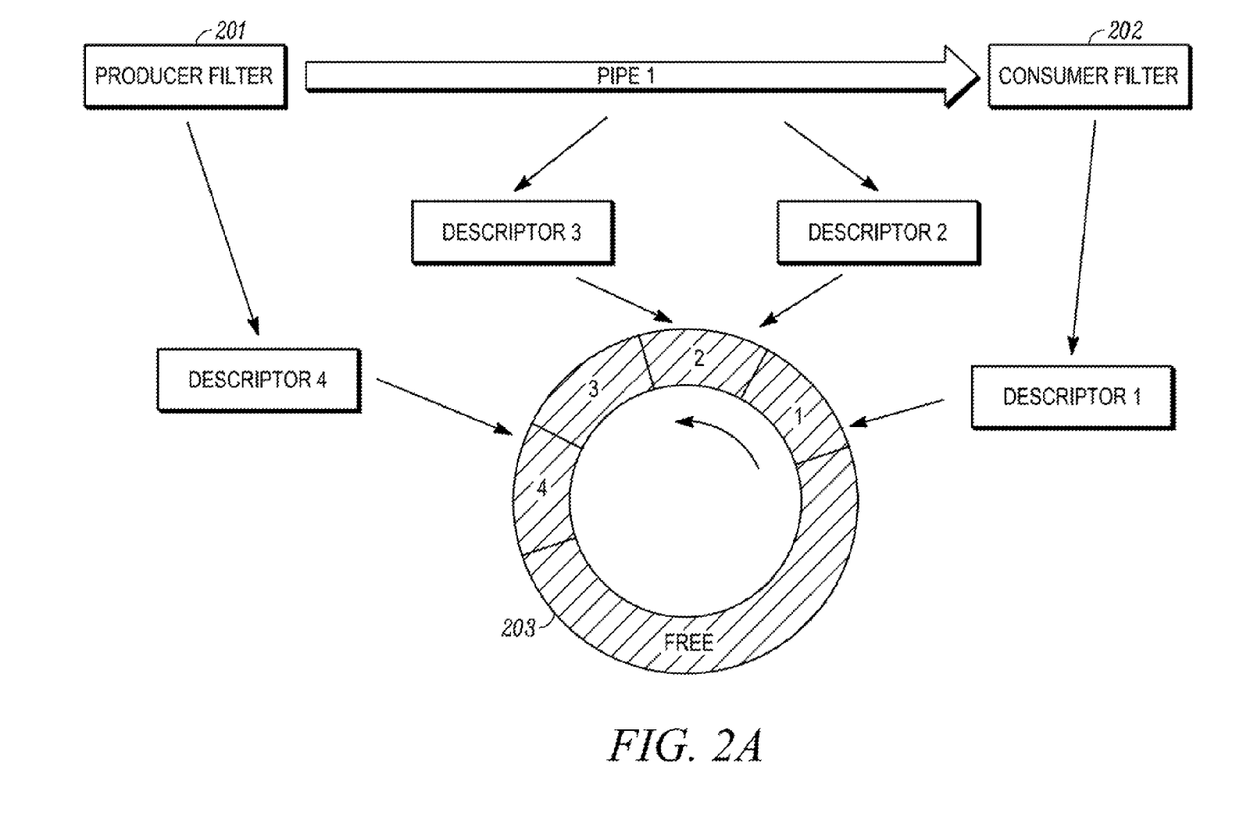
FIGS. 2A and 2B each depict an example array of buffers that may be used with the disclosed record pipeline.
Figure 2B:
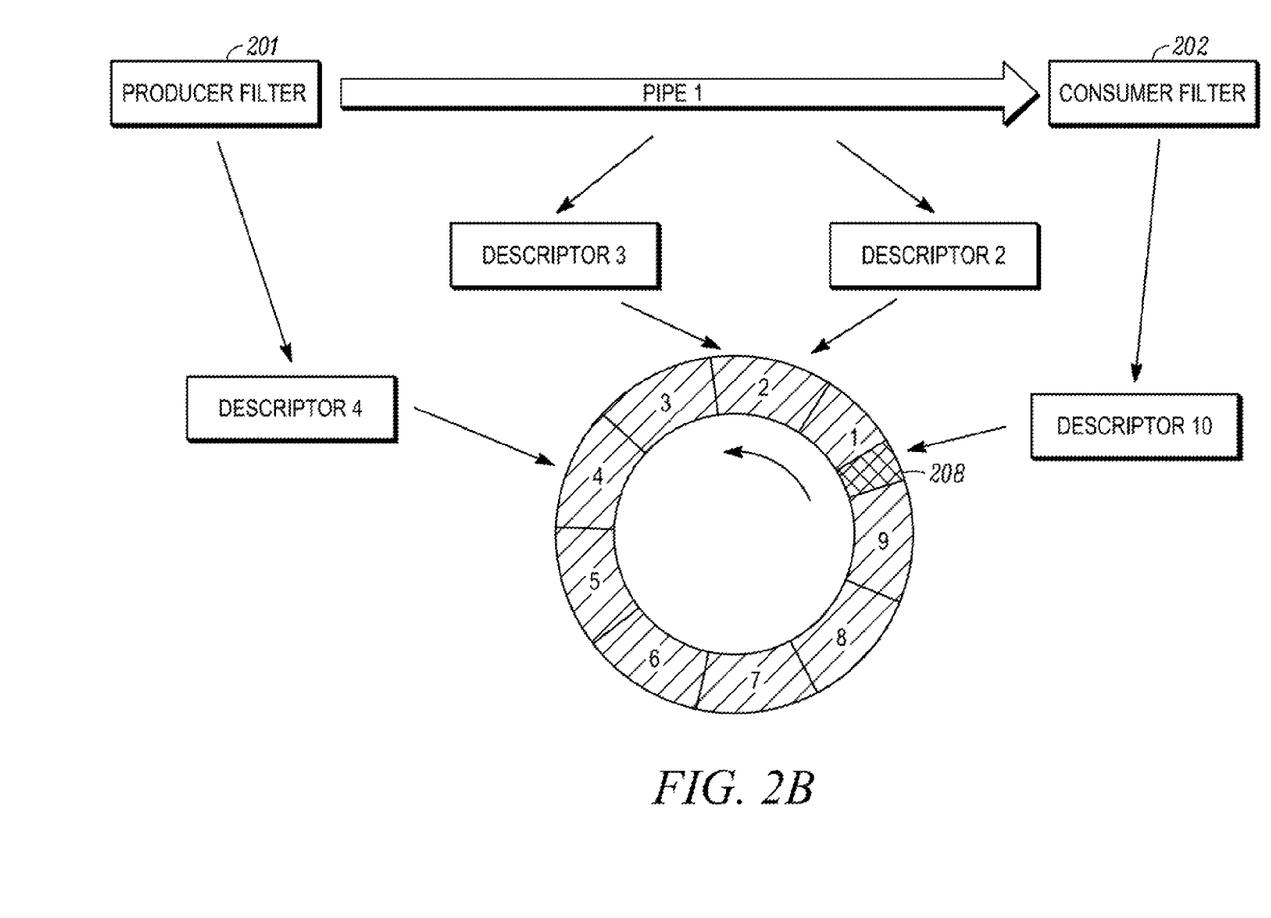
Figure 3:
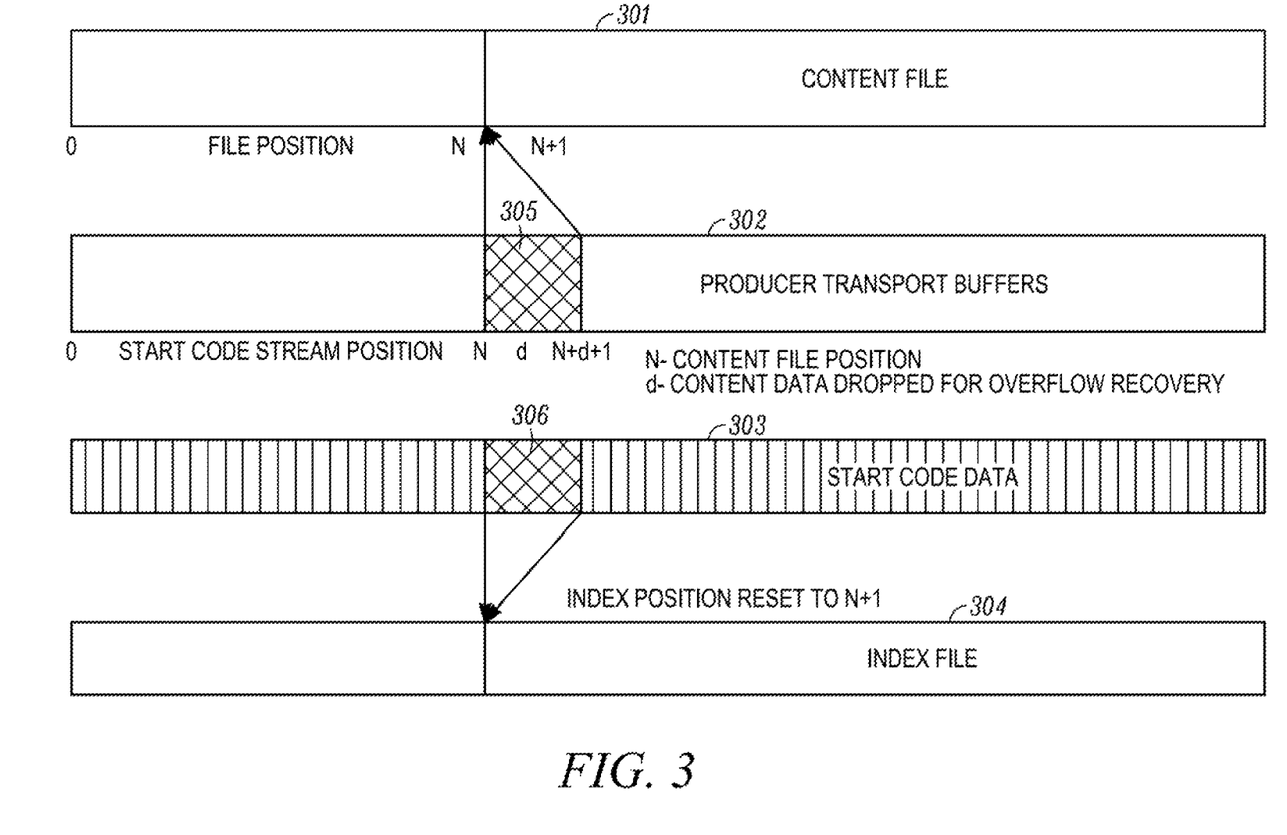
FIG. 3 illustrates a manner for dropping a section of overwritten content data and start code records.

FIGS. 2A and 2B depicts a circulating array of buffers that may be used with the disclosed record pipeline, and FIG. 3 depicts a dropped section 305 of overwritten content data and the corresponding start code records 306 that must be dropped from the index file 304.

As shown in FIG. 2A, a circulating array of buffers may be created for use with the DVR record pipeline 100. The producer at producer filter 201 generates buffer descriptors 1 to be sent to the consumer 202 at consumer filter 202. Descriptors 1, 2, 3, and 4 shown in FIG. 2A identify blocks of memory, or buffers and, as described below, illustrate data at different points in the buffering process for being written to a hard disk 115.

For example, descriptor 1 illustrates data associated with descriptor 1 that has been processed by the pipeline, passed through pipe 1. Buffer 1, allocated for the data associated with descriptor 1, is filled with the data, and the data in buffer 1 is written to the hard drive 115. Buffer 1 is then is re-queued for being filled with subsequent data. Thus, as shown in FIG. 2A, buffer 1 is about to be released back to a free region of the ring for being re-queued.

A queue of memory descriptors 1 for transport buffers waiting to be written to the hard disk 115 may be available to the DVR record pipelines 100. For example, descriptors 2 and 3 illustrate data that is in the midst of being processed and buffered by buffers 2 and 3, respectively. Descriptor 4 illustrates a block of memory or data associated with descriptor 4 that has just been allocated for recording, and will populate buffer 4 with data to be processed in the pipeline. The DVR record pipelines 100 may write to available memory in an unrestrained fashion, treating available buffers in the circular memory of buffers in a continuous record without regard to the status of each buffer (e.g., empty, still writing to the hard drive 115, overwritten, etc).

A memory manager can subdivide the physical memory region that is reserved for DVR buffers and is accessible to the transport processor hardware. Each DVR pipeline 100 instance has a buffer instance that is allocated by the memory manager when the pipeline is initialized. The buffer instance manages the individual record or playback buffers for a single pipeline instance. Each buffer manages the memory region it controls as a ring buffer.

During normal recording, the transport producer pipeline filters 105, 108 do not require feedback or notification from the consumer to create a memory descriptor. For example, the transport producer filters 201 instead can generate a standalone memory descriptor 1, such as descriptors 1, 2, 3, and 4, as each transport buffer is filled with new transport data. The memory descriptor 1 need not contain any reference to the pipeline buffer pool and the producer need not be notified when a transport buffer has been written to the stream file.

FIG. 2B illustrates the circulating array of buffers when there is an overflow condition. During an overflow condition, descriptors in queue may be discarded when an overflow condition is detected. In this manner, the consumer 202 can catch up to the most recent memory descriptor generated by the transport producer. For example, in FIG. 2B, the data associated with descriptor 1 was written to buffer 1, as shown in FIG. 2A, and buffers 1-9 all are full with data to be written to the hard drive 115. Buffer 1 is next in the queue to be filled by data associated with descriptor 10. But, in this example, the data in queued buffer 1 has not yet been completely written to the hard drive 115. The data associated with descriptor 10 is written to buffer and thus overwrites a portion of data 208 in buffer 1 that was associated with descriptor 1 that had not yet been written to the hard drive 115.

In embodiments, the file consumer filter, such as the active file consumer filter 107 shown in FIG. 1 or consumer filter 202 shown in FIG. 2A, may detect the transport data overflow condition by verifying that a checksum for the data buffer matches a checksum computed when the buffer was filled in the transport producer. The buffer checksum may be added to the memory descriptors generated by the transport producer.

The buffer checksum may provide a direct indication that a buffer has been overwritten. The checksum verification may be done after buffer data has written to the hard disk 115 to verify the buffer was not overwritten by new transport data before the buffer data was successfully written to the hard disk 115. Thus, as shown in FIG. 2B, the checksum for the data associated with descriptor 1 when buffer was filled will not match the checksum of the data associated with descriptor 10 written to the hard drive 115.

The memory descriptor from the producer may contain the buffer checksum attribute, which the file consumer uses to verify the buffer was not overwritten before the data was written to the hard disk 115 file. If the checksum verification fails then action is taken to recover and catch up to the current producer position. The memory descriptors may be aligned to transport packet boundaries to avoid potentially writing partial packets to the disk before and after an overflow position.

As disclosed herein, the producer, as described above, is free flowing and will produce transport buffers irrespective of data consumption by the file consumer. The file consumer disclosed may put a descriptor in a queue and send a message to the active consumer filter 107. The message processing de-queues the descriptor and further processes the descriptor.

In embodiments, the overflow condition may be detected in the file consumer by monitoring the stream position in the buffer descriptors instead of by buffer checksum verification. Monitoring the steam position provides the capability to anticipate a buffer overflow condition in advance if necessary. The file consumer filter 107 can determine that a transport data overflow condition has occurred or is likely to occur by monitoring the stream position of the most recent file write and comparing it to the stream position of the most recently received memory descriptor. In an example embodiment, the memory descriptor from the producer will require an overflow limit attribute that the file consumer uses to determine the maximum difference allowed between stream positions waiting to be written to the stream file. If the limit is exceeded then action is taken to recover and catch up to the current producer position.

Using a buffer arrangement like that shown in FIG. 2A or FIG. 2B, the consumer 202, such as the active file consumer filter 107 shown in FIG. 1, does not need to manage pipeline memory or use a buffer pool. Instead, the consumer 202, e.g., active file consumer filter 107, can accept stand alone memory descriptors and store them in a queue to be written to the stream file. For each memory descriptor received, the file consumer appends the transport buffer data to the stream file and then deletes the memory descriptor instance.

FIG. 3 illustrates an example of index overflow recovery processing for removing invalid index records after a section 305 of content data is lost due to overflow detection in the file consumer 107 shown in FIG. 1 or consumer 202 shown in FIG. 2A or FIG. 2B. The index data can be updated to account for dropped data by the consumer, correcting the index data as it corresponds to data in the buffers. FIG. 3 depicts a content file 301 and a corresponding index file 304. The content file 301 begins streaming into one of the producer transport buffer 302 at content file position 0, which corresponds to the start code stream position 0.

At content file 301 position N, however, an overflow condition occurs and content d, shown in area 305 in the producer transport buffers 302, is dropped for overflow recovery. As shown by start code data 303, a similar portion of the start code data 303 should be dropped to align the index file 304 and content file 301. Thus, if section 305 of content data is dropped, the corresponding start code records 306 are dropped in the index pipeline. Invalid index records already written to the index file 304 between file position N and file position N+d+1 (are 306) may be removed from the index file 304. As a result, the content file 301 position N and corresponding content positions referenced in index file 304 are both reset to position N+1, with the section 305 represented by area 305 d dropped from both the content file 301 and the index file 304. Index offsets past the overflow point are changed such that the index offsets hold corrected offsets from the point at which the overflow happened.

Processing index records in the indexing file consumer may include the addition of a content position offset added to the raw position in the index record before the index records are written to the index file 304. Thus, subsequent processing of new index records drop invalid index records before they are written to the index file 304.

Regarding the DVR pipelines, file consumer 107 may include a notification of overflow recovery events in the content pipeline to the index pipeline. An invalid index record removal may be included in the record index pipeline. The invalid index record removal can correct for offsets in content stream position caused by skipping memory descriptors 1 in the file consumer to recover from an overflow condition.

Figure 4:
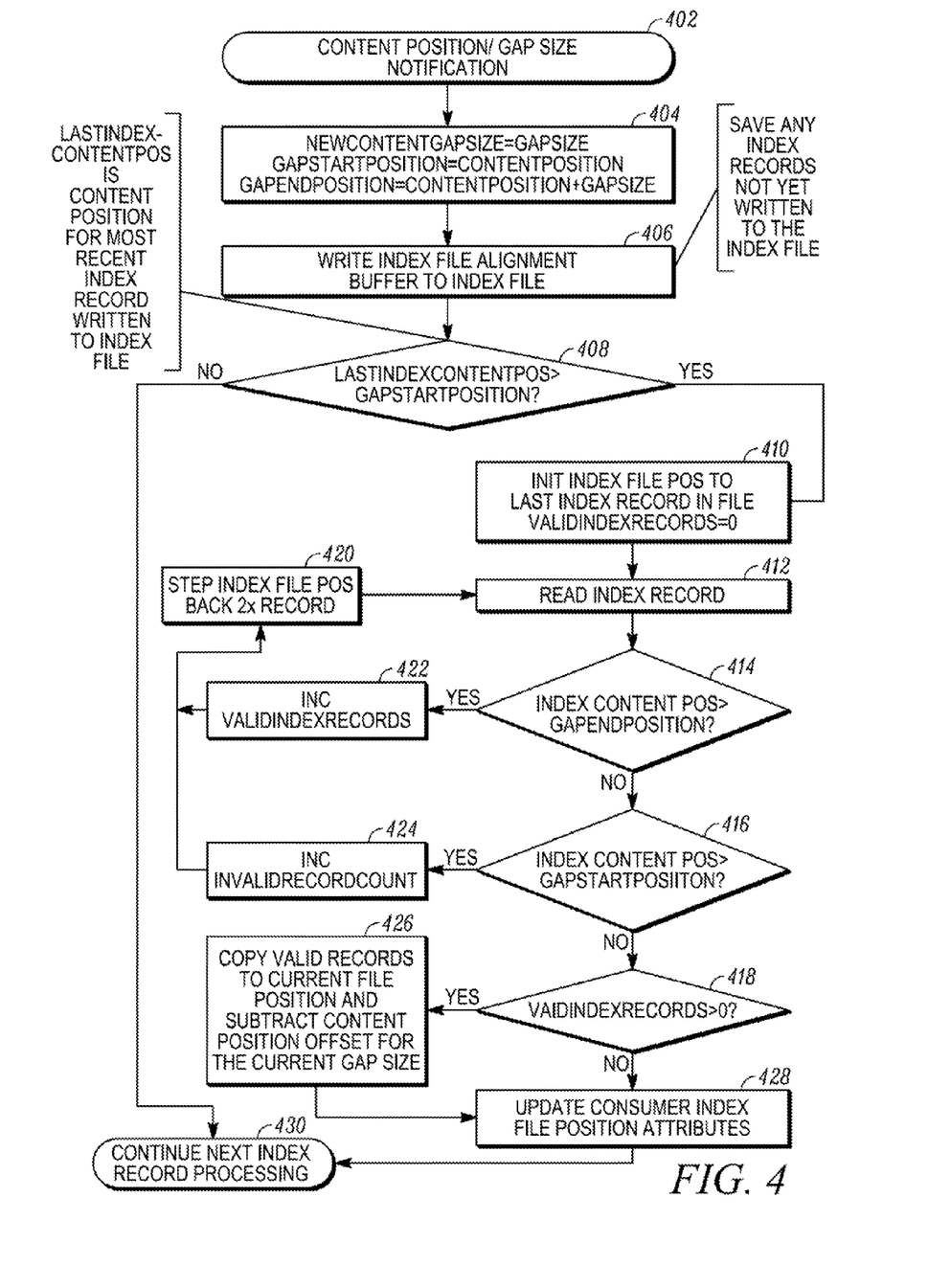
FIG. 4 depicts a flow diagram of an embodiment for invalid index record removal.

FIG. 4 depicts a flow diagram of an embodiment for invalid index record removal. Referring to the example in FIG. 3, a notification of a dropped section 305 of content data may trigger the removal of invalid index records from the index file 304. The processing shown in FIG. 4 includes removing any index records from the index file, such as index file 304, that were generated for content stream data that could not be written in the content file 301 due to overflow conditions. The flow in FIG. 4 is executed, for example, in the index consumer filter 110 each time the content consumer filter 107 recovers from an overflow where a section 305 of the content data stream is not written to the content file 301.

At 402, the content pipeline provides a notification that includes the file position of the content file 301 with dropped data and the size of the gap in the content file 301 of dropped data. The content position is the byte position in content file 301 where the consumer 202 resumed writing transport buffers to the file after a section 305 of content data is dropped. The gap size represents the length in bytes of the section 305 of dropped content data.

At 404, the content position and gap size from the notification received at 402 are used to define a new content gap size (i.e., the gap size provided in the notification), a gap start position (i.e., the content position) and a gap end position (i.e., based on the content position+gap size). The data points (i.e., new content gap size, gap start position, gap end position) defined at 404 correspond to a dropped section of content 305.

At 406, any index records that are buffered in memory have not yet been written to the index file are written to the index file 304.

If the content position in the most recent index record written to the file is prior to the start of the dropped content (the content gap) then no further action on the index file 304 is necessary because none of the index records corresponding to the dropped content have been written to the index file 304.

At 408 if the content position in the most recent index record written to the file is after the start of the dropped content (the content gap), then the processing loop comprised of 410, 412, 414, 416, 422, and 420 checks each index record starting with the last index record in the file and stepping back until an index record prior to the start of the content gap is found.

At 410, the current read position for the index file is set to the last index record written to the file. A counter of valid index records and a counter for invalid index records for the processing loop are set to zero (0).

At 412, the index record at the current file position is read from the index file 304.

At 414, if the content file position referenced by the index record read at 412 is greater than the end of the content gap then increment the count of valid index records at 422 and proceed to the next index record 420. Else if at 414 the content file position referenced by the index record read at 412 is less than or equal to the end of the content gap then the location of the content file position is determined to be within in the content gap at 416

At 416, if the content file position referenced by the index record read at 412 is greater than the gap start position then increment the count of invalid index records at 424 and proceed to the next index record at 420. Else, if at 416 the content file position referenced by the index record read at 412 is less than or equal to the gap start position from 404, the number of valid index records is determined at 418.

At 420 the current index file position is set to the position of the index record prior to the index record previously read at 412. This may be accomplished by subtracting twice the size of one index record from the current index file 304 position and setting the new index file 304 position to the result of the subtraction.

Once the range of now invalid index records corresponding to the content gap is found at 418, the invalid index records are removed by copying any valid index records at 426 to the first position of the invalid records thereby overwriting invalid index records with any valid index records in the index file 304. At 418, if the count of valid index records incremented at 422 is greater than zero, then valid records are copied at 426 to the current index file 304 position and the content position offset is subtracted from the content file 301 position to determine the current gap size. Thus, for each valid index record copied, if any, the size of the content gap is subtracted from the content position contained in the record to compensate for the dropped section 305 of content data.

If it is determined at 418 that the valid index record count is zero or less, the consumer 202 index file 304 position attributes are updated such that the next index record written to the index file 304 will be written after the last valid index record updated at 426.

At 430, the index file 304 position has been set to the next file position after the last valid index record in the index file 304. This completes the update the index file 304 records required to compensate for the dropped section 305 of content.

Figure 5:
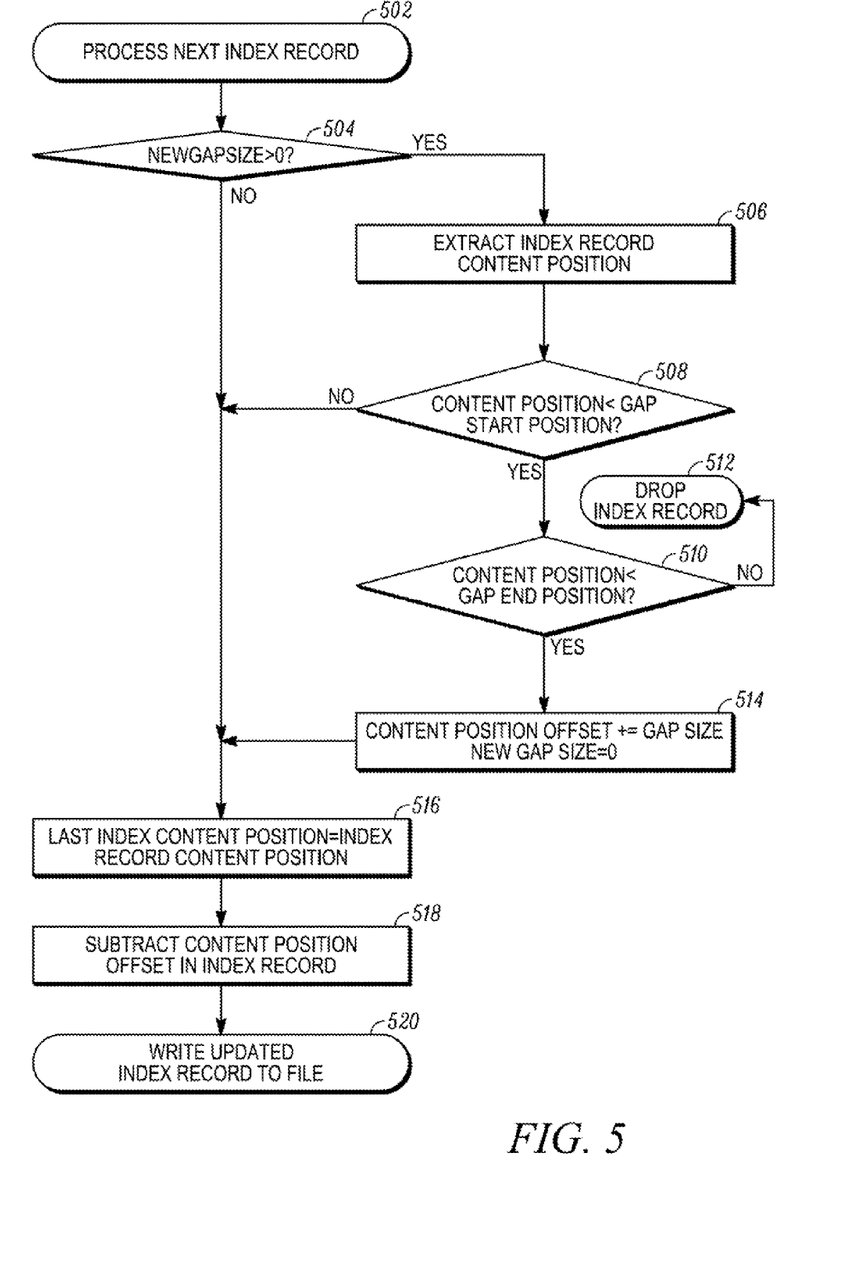
FIG. 5 depicts a flow diagram of an embodiment for updating an index record content position.

FIG. 5 depicts a flow diagram for index record processing, including the processing for discarding any index records corresponding to a dropped section 305 of content, and to compensate for the discrepancy between the content positions generated by the index producer 103 and the actual positions in the content file 301 after any content has been dropped due to overflow conditions. As shown in FIG. 5, subsequent processing of index data will drop any index records referencing an invalid section 305 of content data.

The flow FIG. 5 is executed in the index consumer filter 110 for each index record. At 502, the next index record to be written to index file 304 is generated in the indexing consumer filter 110 by the processing of the start code data 303 buffers provided by the index producer 103. At this step the index record generated from the start code data contains an uncorrected content file position. At 504, if the content gap size is zero as set by previous processing (e.g., such as that shown in FIG. 4), then the content position in the index record is extracted at 516 and converted to the corresponding content file 301 position by subtracting the content position offset variable at 518. At 520, the updated index record is written to index file 304.

If at 504 the gap size is non-zero, the index record position falls between the gap start position and the gap end position (i.e., the content position is greater than the gap start position at 508 and is less than the gap end position at 510) previously set (e.g., by the processing in FIG. 4), then the index record is discarded (dropped) at 512 and processing continues with the next available index record at 502.

If the index record position falls after the gap end position (e.g., the content position is greater than the gap end position at 510), then at 514 the gap size is set to zero and the gap size is added to content position offset to maintain the cumulative size of all dropped sections of content.

For each index record not dropped at 512, the adjusted content position in the index record is saved at 516 in the last index content position variable (e.g., for possible use in the flow of FIG. 4). Further, the content position in the index record is adjusted by subtracting the content position offset to compensate for the cumulative size of dropped sections of content at 514.

The processing flow for the index record is complete at 520 when the index record has been written to the index file 304. Index record processing in FIG. 5 is repeated for next available index record, starting again at 502.

As shown in FIG. 5, the free run producer will continue to generate start code data 303 containing position references for the content stream without any correction for any dropped sections of content data. The corresponding index records created from the producer start code data 303 will contain position references that are offset by the cumulative size of dropped stream data. The position references in valid index records will be corrected with a content position offset calculated to compensate for any dropped stream data as new index records are written to the index file 304. The content position in each index record corrected using the calculated content position offset.

Figure 6:
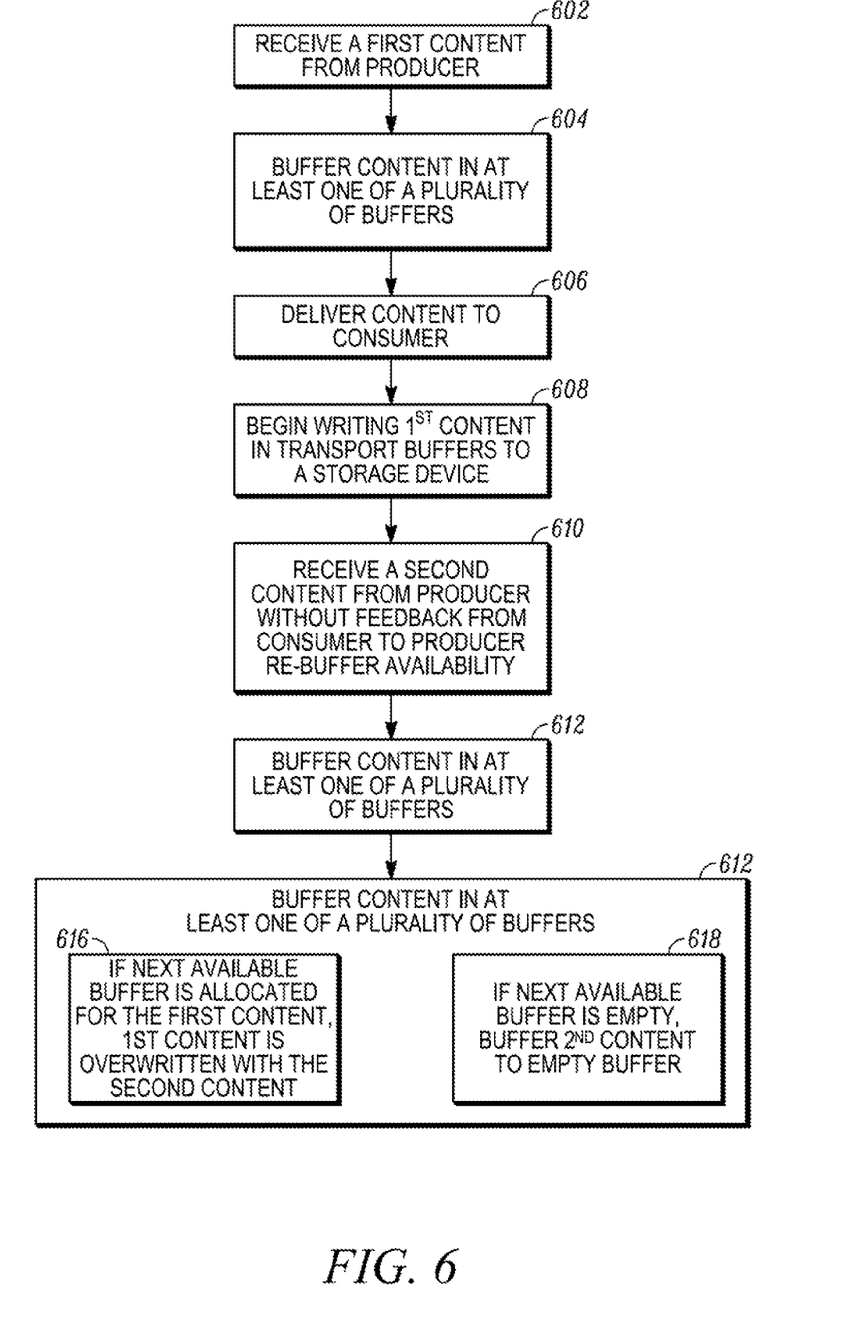
FIG. 6 depicts an example flow diagram for a continuous content flow in a DVR record pipeline.

FIG. 6 depicts an example flow diagram for a continuous content flow in a DVR record pipeline 100, as disclosed herein, with implementations illustrated in the description and in FIGS. 1-5.

At 602, a first content output from a transport pipeline producer in a DVR record pipeline 100 is received. At 604, the first content is buffered in at least one of a plurality of transport buffers. The transport buffers buffer outputs from a transport pipeline producer for delivery to a pipeline data consumer 107, 202 that writes transport buffer content to a storage device 115. Thus, the DVR record pipeline 100 may bridge a content source to a storage device 115.

At 606, the buffers deliver content to the consumer 107, 202 for writing to a storage device 115. In this example, the consumer 107, 202 begins writing the first content in the allocated transport buffer to a storage device 115 at 608. At 610, a second content is received from the transport pipeline producer in the DVR record pipeline 100. The second content is buffered at 612 in at least one of the plurality of transport buffers. The second content is transported from the transport pipeline producer in the DVR pipeline 100 independent of knowledge from the pipeline data consumer 107, 202 whether the first content has been successfully written from the allocated buffer to the storage device 115.

The first content may be successfully written by the pipeline data consumer 107, 202 to the storage device 115 at 608. In another example, a previously filled transport buffer in the plurality of transport buffers may be overwritten by subsequent content from the transport pipeline producer, before the transport buffer content in the previously filled transport buffer is written to the storage device 115. For example, if the first content is not successfully written to a storage device 115, the first content in at least one transport buffer may be overwritten by a subsequent content.

Thus, as shown at 612, if the same buffer allocated for buffering the first content has not finished writing all of the first content to storage, 616 represents the scenario in which the content in the buffer will be overwritten with the second content. If the first content has been written completely to storage or if there are other empty buffers in queue, 618 represents the scenario in which the next available buffer is empty and the second content can be written to an empty buffer. Thus, there is no explicit determination required by the producer that an available buffer is or is not written to the storage device. Rather, the buffers are recorded to continuously without regard to the status of each buffer (e.g., empty, still writing to the hard drive 115, overwritten, etc).

Thus, as shown in FIG. 6, the transport pipeline producer continues transporting subsequent content to the plurality of transport buffers without waiting for feedback regarding an availability of the plurality of transport buffers. In other words, the flow of content from the transport pipeline producer to the plurality of transport buffers is free running and uninterrupted regardless of whether transport buffer content has been written to the storage device 115. The transport pipeline producer may be uninformed as to whether transport buffer content is discarded or ignored by the pipeline data consumer 202. For example, no feedback related to buffer overflow is provided between the pipeline data consumer 107, 202 or storage device 115 and the transport pipeline producer.

In embodiments, a first checksum is computed when first content is buffered in the at least one of the plurality of transport buffers, and the pipeline data consumer 107, 202 detects whether a transport data overflow has occurred by comparing the first checksum to a second checksum associated with the transport buffer content written from the same transport buffer to the storage device 115. The checksum verification may be done after the transport buffer content has been written to the storage device 115 to verify whether the at least one of the plurality of transport buffers was overwritten by subsequent content before the first content was successfully written to the storage device 115.

Figure 7:
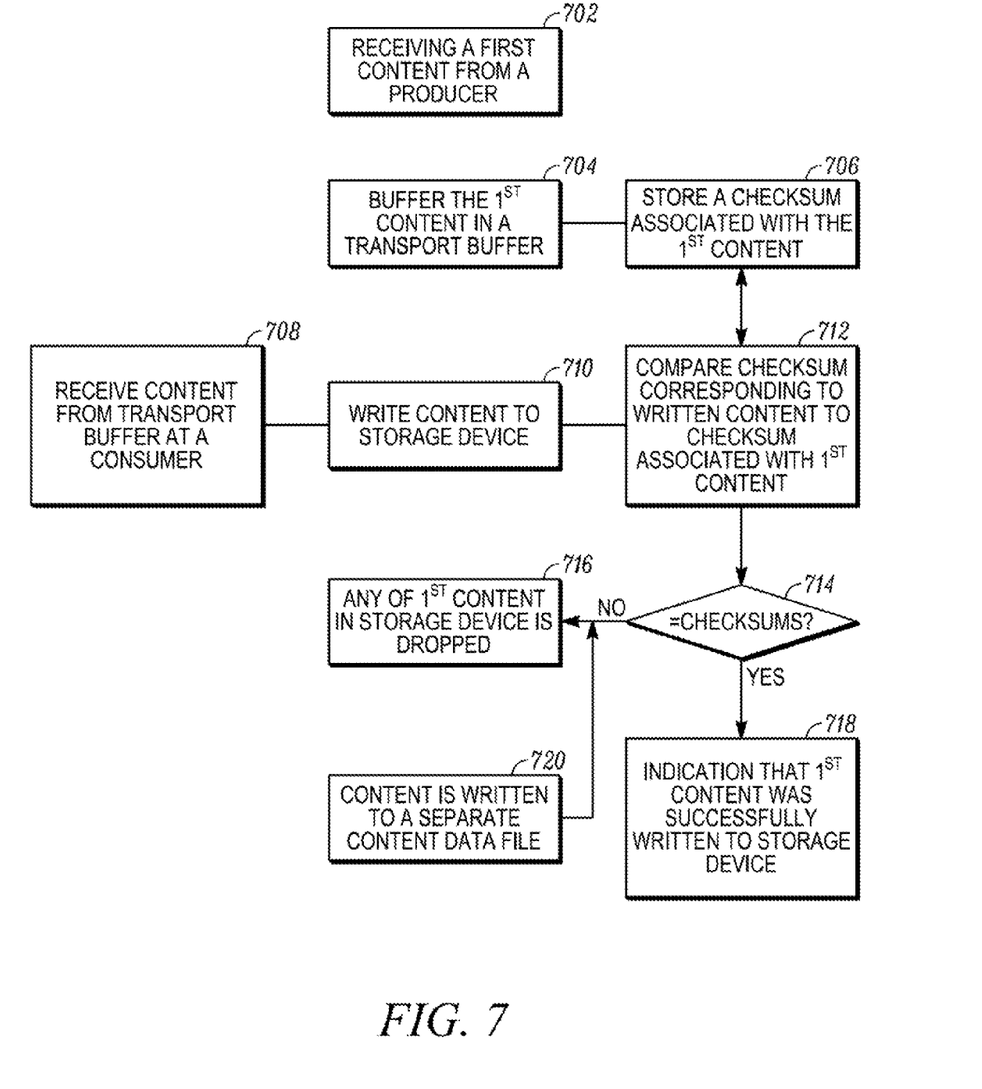
FIG. 7 depicts an example flow diagram for self correcting data overflow in a DVR record pipeline.

FIG. 7 depicts an example flow diagram for self correcting data overflow in a DVR record pipeline 100. At 702, a first content is received from a transport pipeline producer in a DVR record pipeline 100 for recording. Transport buffers buffer outputs from a transport pipeline producer for delivery to a pipeline data consumer 107, 202 that writes transport buffer content to a storage device 115. At 704, the first content is buffered in a transport buffer, and at 706 a checksum associated with the first content is stored when the first content buffers to the transport buffer.

At 708, transport buffer content is received at a pipeline data consumer 107, 202 in the DVR record pipeline 100 for writing to a storage device 115. At 710, the transport buffer content received is written to the storage device 115.

At 712, a checksum corresponding to the transport buffer content written to the storage device 115 is compared to the checksum associated with the first content stored at 706. The pipeline data consumer 202 can use the checksum verification to detect whether a transport data overflow has occurred. For example, if at 714 it is determined that the checksums are the same, an indicator at 718 may be provided that indicates that the transfer buffer content included the first content and the first content was successfully written to the storage device 115.

If at 714 it is determined that the checksums are not the same, an overflow condition has occurred. The checksums may not be the same, for example, if the first content in the transport buffer was not successfully written to the storage device 115 before being overwritten by subsequent content. In embodiments, if the first content in the transport buffer is overwritten by subsequent data before being successfully written to a content stream file, the pipeline data consumer 107, 202 drops the overwritten buffers to recover from the data overflow. For dropped content, the pipeline data consumer 202 may initiate a drop of the corresponding start code records 306 from an index file 304.

In embodiments, such as at 716, the pipeline data consumer 107, 202 causes the first content in the storage device 115 to be dropped to recover from the data overflow. The pipeline data consumer 107, 202 may save computing power when a content drop is detected. In embodiments, such as at 720, the location and size of overwritten transport buffer content or the location and size of the first content may be written to a separate content data file. The content data file may be a separate meta file and it may be used at the time of a playback of content to maintain a continuity of the playback.

Depending on the circumstances, the system may determine whether to drop content at 716 or write location and size of overwritten content to a separate data file at 720, or the system may perform both. Thus, in some examples, content with a faulty checksum (e.g., the first content that fails the checksum with the transport buffer content written to storage), may not be discarded.

It is noted that for the disclosed techniques, the pipeline data consumer 107, 202 may recover from the data overflow without interruption to the flow of content from the transport pipeline producer. In other words, the content flow from the transport pipeline producer is unaffected by whether data that is provided to the plurality of transport buffers is discarded or ignored by the pipeline data consumer 107, 202, even where there is no communication or feedback between the backend (consumer 107, 202/hard drive 115) and the producer related to buffer overflow. If no buffers are available that have been successfully written to the storage device 115, the subsequent content from the transport pipeline producer overwrites transport buffer content.

In embodiments, such as that shown in FIG. 7, the checksum verification is done after the transport buffer content has been written to the storage device 115, so transport buffer content is written to the storage device uninterrupted.

While example embodiments of a DVR record pipeline have been described in connection with various software, hardware, and computing devices, the underlying concepts can be applied to any computing device or system capable of performing each of the described functions. The various techniques described herein can be implemented in connection with hardware or software or, where appropriate, with a combination of both.

For example, the techniques disclosed herein and shown in FIGS. 1-6 may be performed on a system comprising an input component, a processor, a transport pipeline producer module, a pipeline data consumer module, and transport buffer modules. For example, the input component may receive the first content output from a transport pipeline producer in a DVR record pipeline. The transport buffer may buffer outputs from a transport pipeline producer for delivery to a pipeline data consumer that writes transport buffer content to a storage device. The processor may process the received content, performing the checksum aspects of the techniques disclosed herein. The transport pipeline producer module may creating stream data buffers a storage device.

Further, the techniques disclosed herein and shown in FIGS. 1-6 may be performed via computer-implemented program instructions on a physical storage medium. Thus, the methods and apparatus for dropping content data or synching index records, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for buffer management in a DVR system. In the case of program code execution on programmable computers, the computing device will generally include a processor, a physical storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. Example computer readable media that may be used to store software operable to implement the present invention include but are not limited to conventional computer system RAM, ROM, EPROM, EEPROM, hard disks, or other data storage devices.

While methods and components for a self correcting record pipeline have been described in connection with the various embodiments of the various Figs., it is to be understood that other similar embodiments can be used or modifications and additions can be made to the described embodiment for performing the same functions without deviating there from. For example, one skilled in the art will recognize that the DVR pipeline described in the present application for recording content may a pipeline in a number of such devices connected via a communications network and interacting across the network. Therefore, the techniques disclosed should not be limited to any single embodiment, but rather should be construed in breadth and scope in accordance with the appended claims.

Reference throughout this specification to one embodiment, an embodiment, an example embodiment, an example, or similar language means that a particular feature, structure, or characteristic described in connection with the embodiment is included in at least one embodiment of the present techniques disclosed. Thus, appearances of the phrases in one embodiment, in an embodiment, an example embodiment, an example, and similar language throughout this specification may, but do not necessarily, refer to the same embodiment.

What is claimed:

1. A method for continuous content flow in a digital video recorder (DVR) record pipeline, the method comprising:
   buffering, in at least one of a plurality of buffers, a first content from a pipeline producer in the DVR record pipeline, wherein the plurality of buffers buffer outputs from the pipeline producer for delivery to a pipeline data consumer that writes buffer content to a storage device,
   wherein the pipeline producer continues transporting subsequent content to the plurality of buffers without waiting for feedback regarding an availability of the plurality of buffers;
   transporting, from the pipeline producer in the DVR record pipeline, a second content to at least one of the plurality of buffers, independent of whether the first content has been successfully written from the at least one of the plurality of buffers to the storage device,
   wherein a first checksum is computed when first content is buffered in the at least one of the plurality of buffers, and the pipeline data consumer detects whether a data overflow has occurred by comparing the first checksum to a second checksum associated with buffer content written from the same buffer to the storage device, and
   wherein a checksum verification is done, before index data is written to the storage device, to verify whether at least one of a plurality of start code buffers was overwritten by subsequent start code data before index data produced from a first start code data is successfully written to the storage device.

2. The method of claim 1, wherein the first content is successfully written by the pipeline data consumer to the storage device.

3. The method of claim 1, wherein a previously filled buffer in the plurality of buffers is overwritten by subsequent content from the pipeline producer, before the buffer content in the previously filled buffer is written to the storage device.

4. The method of claim 1, wherein the first content is not successfully written to the storage device, the first content in at least one buffer is overwritten by the second content.

5. The method of claim 1, wherein the checksum verification is done after transport buffer content has been written to the storage device to verify whether at least one of the plurality of transport buffers was overwritten by subsequent content before the first content was successfully written to the storage device.

6. The method of claim 1 wherein index data produced from start code data in a buffer is not written to the storage device if checksum verification fails for the start code data.

7. The method of claim 1, wherein a flow of content from the pipeline producer to the plurality of transport buffers is free running and uninterrupted regardless of whether transport buffer content has been written to the storage device.

8. The method of claim 1, wherein the DVR record pipeline bridges a content source to the storage device.

9. The method of claim 1, wherein the pipeline producer is uninformed as to whether buffer content is discarded or ignored by the pipeline data consumer.

10. The method of claim 1, wherein there is no feedback related to buffer overflow between the pipeline data consumer or storage device and the pipeline producer.

11. A method for self correcting data overflow in a digital video recorder (DVR) record pipeline, the method comprising:
   buffering, at a transport buffer that buffers outputs from a transport pipeline producer for delivery to a pipeline data consumer, a first content from the transport pipeline producer for recording, wherein a checksum associated with the first content is stored when the first content buffers to the transport buffer;
   receiving, at the pipeline data consumer in the DVR record pipeline, transport buffer content from the transport buffer for writing to a storage device; and
   writing the transport buffer content to the storage device, wherein the pipeline data consumer detects whether a transport data overflow has occurred by comparing a checksum corresponding to the transport buffer content written to the storage device to the checksum associated with the first content,
   wherein if the checksums are not the same, the pipeline data consumer causes any of the first content in the storage device to be dropped to recover from the data overflow or writes a position or size of the transport buffer content that has failed checksum verification to a content file, wherein limits of the transport buffer content with the failed checksum verification are written onto another location on the storage device.

12. The method of claim 11, wherein checksums that are the same indicate that the transfer buffer content included the first content and the first content was successfully written to the storage device.

13. The method of claim 11, wherein if the checksums are not the same, the first content in the transport buffer was not successfully written to the storage device before being overwritten by subsequent content.

14. The method of claim 11, wherein the checksum verification is done after the transport buffer content has been written to the storage device so transport buffer content is written to the storage device uninterrupted.

15. The method of claim 11, if the first content in the transport buffer is overwritten by subsequent data before being successfully written to the content file, the pipeline data consumer drops the overwritten buffers to recover from the data overflow.

16. The method of claim 11, wherein for dropped content, the pipeline data consumer initiates a drop of the corresponding start code records from an index file.

17. The method of claim 11, wherein the pipeline data consumer recovers from a data overflow without interruption to a flow of content from the transport pipeline producer.

18. The method of claim 11, wherein the DVR record pipeline bridges a content source to the storage device.

19. The method of claim 11, wherein the content flow from the transport pipeline producer is unaffected by whether data that is provided to the plurality of transport buffers is discarded or ignored by the pipeline data consumer.

20. The method of claim 11, wherein there is no communication or feedback between a backend (consumer/hard drive) and the pipeline producer related to buffer overflow.

21. The method of claim 11, wherein when no buffers are available that have been successfully written to the storage device, the subsequent content from the transport pipeline producer overwrites transport buffer content.

22. The method of claim 11, wherein the content file is separate meta file.

23. The method of claim 22, wherein the separate meta file created will be used at a time of playback to maintain a continuity of the playback.

24. The method of claim 11, wherein the pipeline data consumer saves computing power when a content drop is detected.

* * * * *